Aug. 11, 1959   C. L. GOLDTRAP   2,898,604
TOILET FLUSH TANK ASSEMBLY
Filed June 28, 1957
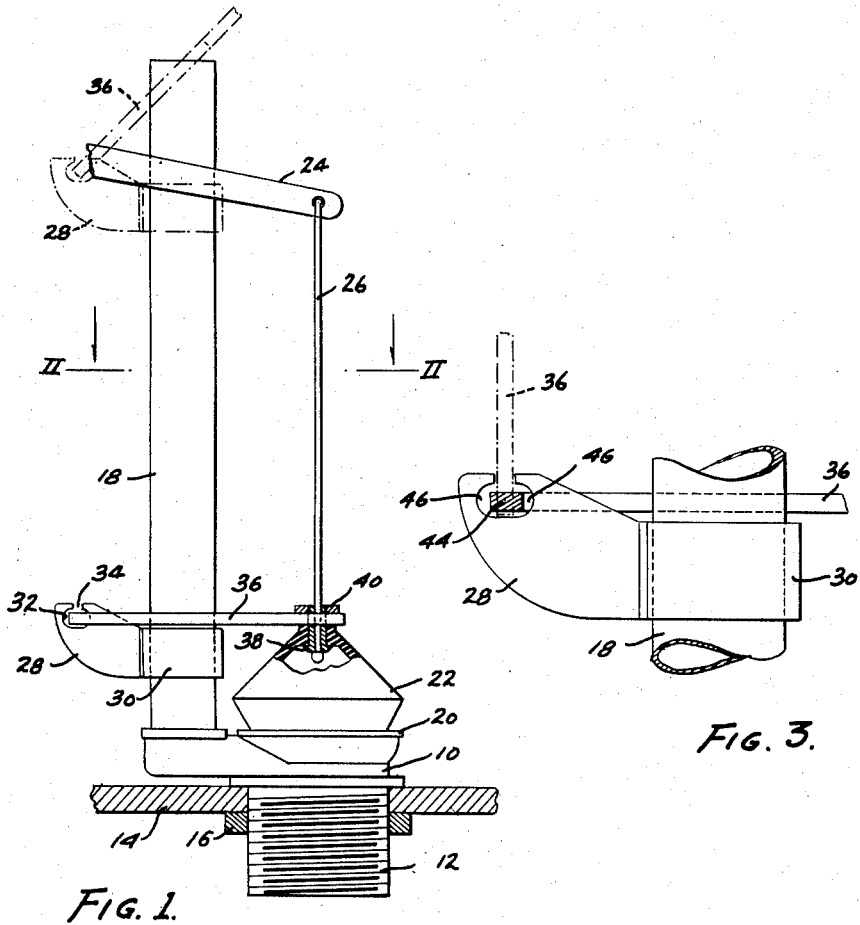
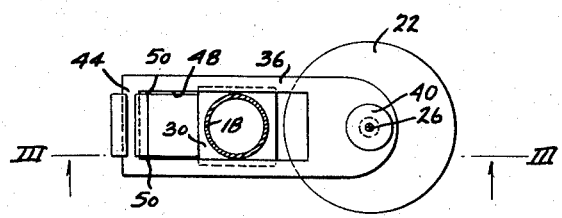
INVENTOR.
CHARLEY L. GOLDTRAP
BY
Bean, Brooks, Buckley & Bean
ATTORNEYS

United States Patent Office 2,898,604
Patented Aug. 11, 1959

2,898,604

TOILET FLUSH TANK ASSEMBLY

Charley L. Goldtrap, Denver, Colo.

Application June 28, 1957, Serial No. 668,816

1 Claim. (Cl. 4—57)

This invention relates to plumbing equipment, and more particularly to an improved dump valve apparatus or assembly as may be employed in and form a part of a toilet flush tank or the like.

As is well known in the art, the usual dump valve structure comprises a valve seat on which rests a generally ball shaped valve member having float characteristics whereby once the valve member is raised from the seat it is maintained in open or raised position by buoyancy until the flush tank is substantially empty, after which it is allowed to fall by gravity onto the seat to close its aperture. Numerous mechanisms have been devised to guide the valve member to the valve seat as it falls theretoward at the end of the flush operation.

As is common knowledge, many such devices become deformed or corroded whereby the ball valve sticks in open position or fails to come into proper seating alinement with the valve seat, thereby producing an annoying condition wherein the flush tank fails to refill properly, and wherein water continuing to flow through the flush tank and past the improperly seated valve is wasted. Numerous cage and other kinds of structures have been devised in an effort to guide the ball valve toward the valve seat while permitting a degree of freedom so that the valve member can be self-aligning. Also, numerous arrangements have been devised with a view to providing simplicity of installation, preferably without the use of tools.

In accordance with the present invention, an unusually simple dump valve structure is provided, utilizing existing flush tank elements, such as the overflow pipe commonly forming a part of the outlet valve seat structure, and providing a trouble-free mount for the dump valve member comprising only two simply shaped parts which may be manufactured readily from plastic or other desirable corrosion-free material. A single pivotal joint employed in the structure provides both for freedom permitting self-alinement of the valve member and for detachable connection of the valve member, the valve being positively secured and locked into the assembly when the parts are in their normal position for use but provision being made whereby the valve part may be moved to another position wherein it has complete freedom for detachment in a facile manner, all by hand and without the use of tools.

Accordingly, a primary object of the invention is to provide an improved dump valve assembly for flush tanks or the like.

Another object of the invention is to provide an improved valve mechanism in cooperative association with the conventional overflow pipe as an improved mounting and guide therefor and detachment means lock for the float valve bearing member.

Still other objects of the invention are to provide an improved dump valve structure as aforesaid which is inherently free from corrosion, is insusceptible to deformations such as could cause the dump valve to stick or fail to seat properly, and is adapted for inexpensive manufacture.

The above and other objects of the invention will be apparent from the foregoing general discussion, the following description and claim, and from the drawing, wherein:

Fig. 1 is a fragmentary view of a flush tank equipped with a dump valve structure in accordance with the present invention and showing, in dot-dash line, an alternate position of the dump valve bearing lever and bracket;

Fig. 2 is a sectional view taken about along line II—II of Fig. 1; and

Fig. 3 is a fragmentary sectional view on an enlarged scale, taken about along line III—III of Fig. 2, and indicating an alternate position of the valve member bearing lever in dot-dash line.

Referring more particularly to the drawing, a preferred embodiment of the invention is illustrated as applied to and incorporating a conventional dump valve outlet fitting 10 having the usual outlet nipple 12 by which the fitting is mounted in a flush tank 14 by a collar or nut 16. The fitting 10 includes an overflow pipe 18 standing upwardly in the tank 14, in offset relation to the valve seat 20 of the fitting as shown. The aforedescribed structure is designed to cooperate with some kind of dump valve, such as a hollow rubber generally ball-shaped member 22, or like float type valve which engages the valve seat 20. An operator arm 24, provided with an operator handle (not shown), is arranged to unseat the valve 22 for the tank emptying operation, a connection 26 being provided between the arm 24 and the valve member 22 for this purpose.

It will be understood that the valve seat 20 is cup shaped to provide for final self-alignment of the valve member 22 as it seats therein. In accordance with the present invention, means are provided whereby the dump valve 22 is connected detachably to the structure with which it cooperates in a manner to control its path of downward motion toward the valve seat 20 in a positive manner and along a definite path which invariably brings it into proper seating alinement. A degree of latitude which permits the final seating is accomplished through a hinged connection, the journal axis of which is provided with sufficient play to allow limited freedom of lateral motion to the valve for such final alinement. The hinged connection is so constructed as to enable disassembly of the valve when its mount is displaced along the overflow pipe to an abnormal position which it cannot normally assume, thereby utilizing the overflow pipe in a new capacity, namely, as a lock member for holding the valve components together.

Accordingly, in the illustrated embodiment of the invention, a valve mount in the form of a bracket 28 is provided having a collar portion 30 adapted to slip over and frictionally engage the overflow pipe 18 for being brought to and maintained in its operative position shown in full line in the drawing. This provides a frictional retention of the collar 30 in position, and to this end, the bracket 28 is made from a stiffly or self-sustaining resilient material, such as nylon, with the bore of the collar 30 being somewhat undersized with respect to the pipe 18 to have a tight but manually displaceable fit thereon. It will be noted that the bracket 28 extends in cantilevered fashion from the pipe 18 in a direction opposite from the valve seat 20 and terminates in an upwardly opening bearing 32 having a restricted slot entrance 34, resulting in a generally keyhole shaped formation.

The dump valve 22 is interconnected with the bracket 28 by a valve carrying lever 36 which is connected to the valve in any suitable manner, this connection preferably being fairly rigid such as may be provided by a collar or bushing 38 and having a shoulder 40 clamping the end of the lever to the valve member 22 as shown.

The other end of the lever 36 is provided with a transverse journal portion 44 having greater width than thickness in cross section, the width and thickness of this journal portion being dimensioned with respect to the upwardly opening bearing 32 so that the thickness of the journal portion will pass through the slot opening 34 while its width will not. Further, as shown most clearly in Fig. 3, the internal portion of the bearing is wide enough to permit the journal portion 44 of the lever considerable play in directions toward and away from the valve seat as indicated at 46—46, and is shaped to accommodate rotation of the lever 36 from the position shown in full line of that figure to the position shown in dotted line therein for disengagement of the lever from the journal connection through the entrance 34 thereof.

As shown in Fig. 2 of the drawing, the lever 36 is formed with a central opening 48 which receives the upstanding overflow pipe 18 with a small clearance to have a free but guiding fit therewith. The journal part 44 has opposing stop shoulders 50, 50 which limit the shifting of the lever along the hinge axis although permitting a certain amount of play in this direction.

Accordingly it will be seen that the journal connection 32, 44 permits a small degree of play in the position of the dump valve 22 in directions toward and away from the journal mount by virtue of the oversize relation of the bearing 32 with respect to the width of the journal portion 44, which latitude or play in the position of the valve in horizontal directions at right angles to that shifting is controlled chiefly by the axial play at 50—50 in the pivot connection as fulcrumed about the overflow pipe 18. The lever is not permitted to rotate freely about the hinge connection in the horizontal plane, horizontal motion transverse of the lever being limited by the overflow pipe 18 as a guide so as to be confined chiefly to rotation about the pipe as a fulcrum point. Thus, although the journal connection is a loose fit, this looseness is not permitted to allow undue latitude of motion of the valve member 22 in the direction generally parallel to the axis of the journal.

In order to provide the valve 22 with complete freedom to follow the vertically arcuate path predetermined by the bracket and lever connection aforedescribed, it is preferred that the connection 26 between the operating arm 24 and the ball 22 be of a highly flexible nature such as may be provided by a cable, chain, or other filamentary connector. A plastic coated metal cable such as shown is highly desirable for this purpose since it is flexible and strong, and yet free from the effects of corrosion and substantially incapable of being fouled.

This highly flexible nature of the connection 26 is further desirable for cooperation with the method of disengagement of the lever 36 from the bracket 28 in accordance with the present invention. In accordance with that method, it is necessary merely to move the bracket 28 to the position shown in dot dash line in Fig. 1 by simply slipping the collar 30 upwardly along the overflow pipe 18 by hand. After the bracket 30 has been raised to that position it will be seen that the lever 36 may be swung upwardly as indicated by the dotted showing thereof in that figure, so that the arm aperture or opening 48 and the ball valve 22 clear the end of the pipe 18, thereby permitting the lever to be raised to a fully vertical position such as indicated in dot dash lines in Fig. 3. Thereupon the lever may be lifted by hand from the bearing 32.

For avoiding corrosion, as well as for providing smooth operation at the pivotal connection 32, 44 and the sliding bearing 18, 48 with the overflow pipe, it is preferred that the arm 36 be made from a plastic material having a low coefficient of friction, such as nylon.

From the foregoing it will be evident that the present invention provides an unusually simple dump valve mechanism wherein the position of the valve member 22 is controlled with precision and in a manner in which both misalinement of the valve and any possibility of sticking or jamming of the mechanism are positively precluded. It will be further seen that the apparatus of the invention makes maximum use of existing plumbing facilities such as the overflow pipe 18, which in addition to its overflow function is made to serve the functions of a mount location for the bracket 28, a pivot fulcrum for the lever 36, and a lock precluding disengagement of the hinge joint 32, 44 until the bracket-lever assembly is raised to a position where the dump valve and its lever will clear the upper end of the pipe 18.

While only one form of the invention has been illustrated and described in detail it will be understood that the invention may be embodied otherwise within the spirit of the invention and the scope of the appended claim.

What is claimed is:

In combination with a flush tank unitary outlet fitting having an upstanding overflow pipe and an offset valve seat, a bracket adjustably and frictionally mounted on the overflow pipe carrying a laterally extending projection located at the opposite side of the overflow pipe from said valve seat, said projection being formed with an upwardly opening transverse slot which extends downwardly into an enlarged key-hole shaped bearing, and a unitary lever carrying at one end a dump valve adapted to cooperate with said valve seat and having a transverse journal formed on its other end and inserted in said key-hole bearing, said journal being of a rectangular cross-section the horizontal dimension of which is larger than the width of said transverse slot whereby said journal is removable from said bearing when the lever is moved to a vertical position, the ends of said lever being connected by a pair of elongated parallel arms defining therebetween a center cut-out portion through which the overflow pipe projects, said cut-out portion having substantially the same width as the overflow pipe so that the overflow pipe can guide the lever in its operative movements, said journal and bearing being formed with a slightly loose fit to permit slight lateral movements of the dump valve as it descends towards its seat, said bracket and lever being formed of non-corrosive plastic material.

References Cited in the file of this patent

UNITED STATES PATENTS

| | | |
|---|---|---|
| 1,496,466 | Jackson | June 3, 1924 |
| 2,333,732 | Morris | Nov. 9, 1943 |
| 2,754,522 | Earsley | July 17, 1956 |
| 2,767,406 | Bennett | Oct. 23, 1956 |
| 2,776,437 | Detjen | Jan. 8, 1957 |
| 2,779,028 | Branch | Jan. 29, 1957 |
| 2,781,520 | Micek | Feb. 19, 1957 |

UNITED STATES PATENT OFFICE
CERTIFICATE OF CORRECTION

Patent No. 2,898,604                                      August 11, 1959

Charley L. Goldtrap

It is hereby certified that error appears in the printed specification of the above numbered patent requiring correction and that the said Letters Patent should read as corrected below.

Column 3, line 27, for "which latitude" read -- while latitude --.

Signed and sealed this 9th day of February 1960.

(SEAL)
Attest:
KARL H. AXLINE
Attesting Officer

ROBERT C. WATSON
Commissioner of Patents